US012580649B2

(12) United States Patent
Jia et al.

(10) Patent No.: US 12,580,649 B2
(45) Date of Patent: Mar. 17, 2026

(54) OPTICAL SIGNAL-TO-NOISE RATIO MEASUREMENT METHOD AND APPARATUS, AND COMPUTER STORAGE MEDIUM

(71) Applicant: ZTE CORPORATION, Shenzhen (CN)

(72) Inventors: Yinqiu Jia, Shenzhen (CN); Hu Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 313 days.

(21) Appl. No.: 18/572,438

(22) PCT Filed: Jun. 10, 2022

(86) PCT No.: PCT/CN2022/098224
§ 371 (c)(1),
(2) Date: Dec. 20, 2023

(87) PCT Pub. No.: WO2023/273840
PCT Pub. Date: Jan. 5, 2023

(65) Prior Publication Data
US 2024/0235672 A1      Jul. 11, 2024

(30) Foreign Application Priority Data

Jun. 28, 2021    (CN) .......................... 202110719881.2

(51) Int. Cl.
*H04B 10/079*          (2013.01)
*H04B 10/564*          (2013.01)
*H04B 10/572*          (2013.01)

(52) U.S. Cl.
CPC . *H04B 10/07953* (2013.01); *H04B 10/07955* (2013.01); *H04B 10/564* (2013.01); *H04B 10/572* (2013.01)

(58) Field of Classification Search
CPC ........ H04B 10/07953; H04B 10/07955; H04B 10/564; H04B 10/572; H04B 10/0775
See application file for complete search history.

(56) References Cited

U.S. PATENT DOCUMENTS

| | | | |
|---|---|---|---|
| 2007/0009259 A1 | 1/2007 | Dragovic et al. | |
| 2008/0080857 A1* | 4/2008 | Goto ................ | H04B 10/07953 |
| | | | 398/26 |

(Continued)

FOREIGN PATENT DOCUMENTS

| | | |
|---|---|---|
| CN | 101345582 A | 1/2009 |
| CN | 102763350 A | 10/2012 |

(Continued)

OTHER PUBLICATIONS

European Patent Office. Extended European Search Report for EP Application No. 22831660.0, mailed Sep. 10, 2024, pp. 1-8.

(Continued)

*Primary Examiner* — Hibret A Woldekidan
(74) *Attorney, Agent, or Firm* — Vivacqua Crane, PLLC

(57) ABSTRACT

An OSNR measurement method and apparatus, and a computer storage medium are disclosed. The OSNR measurement method may include: adjusting a measurement light source to an ASE state (S100); adjusting a signal width of the measurement light source to a first width according to a spectral bandwidth of a channel to be measured, and acquiring a total channel power at an OPM point of a receive-end station (S200); adjusting the signal width of the measurement light source to a second width, and acquiring a noise power at the OPM point of the receive-end station (S300), where the second width is less than the first width, and center frequencies of signals corresponding to the first width and the second width are staggered apart from each other; and (Continued)

determining an OSNR of the channel to be measured according to the total channel power and the noise power (S400).

20 Claims, 8 Drawing Sheets

(56) References Cited

U.S. PATENT DOCUMENTS

| | | | | |
|---|---|---|---|---|
| 2008/0124076 A1* | 5/2008 | Rudolph | .......... | H04B 10/07953 |
| | | | | 398/26 |
| 2015/0043906 A1 | 2/2015 | Zhou et al. | | |
| 2017/0302372 A1* | 10/2017 | Yamauchi | ........ | H04B 10/07957 |
| 2018/0048385 A1* | 2/2018 | Harris | ............... | H04B 10/0795 |
| 2019/0296851 A1* | 9/2019 | Jiang | ................... | H04J 14/0261 |

FOREIGN PATENT DOCUMENTS

| | | |
|---|---|---|
| CN | 104052544 A | 9/2014 |
| CN | 110048770 A | 7/2019 |
| WO | 2021009754 A1 | 1/2021 |

OTHER PUBLICATIONS

International Searching Authority. International Search Report and Written Opinion for PCT Application No. PCT/CN2022/098224 and English translation, mailed Jul. 27, 2022, pp. 1-11.

\* cited by examiner

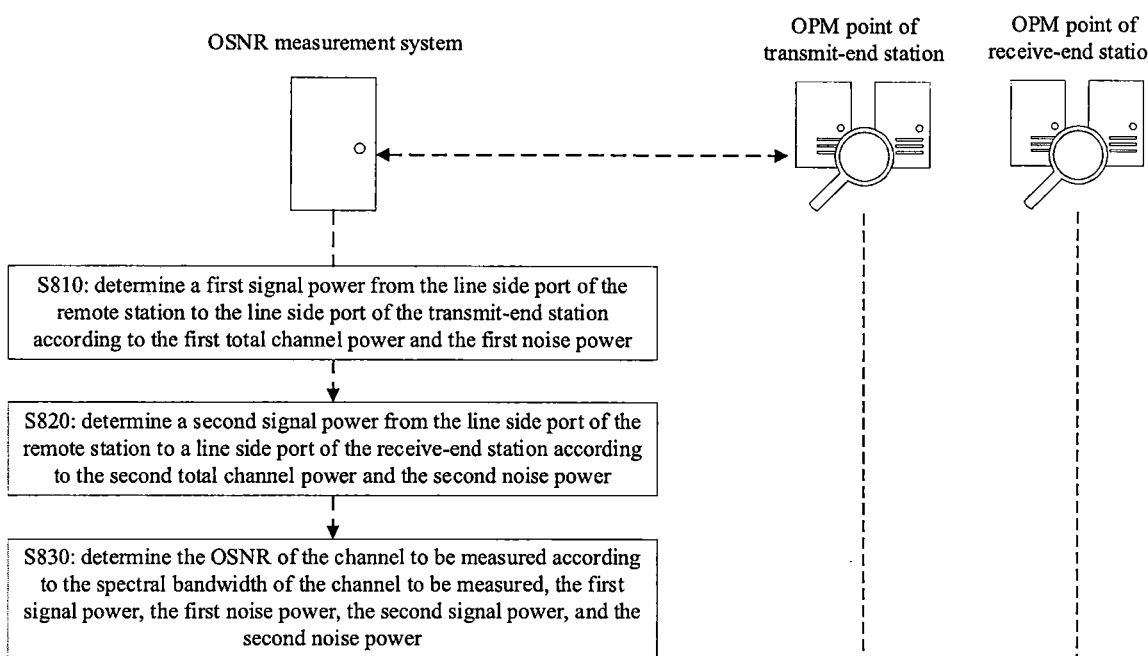

OSNR measurement system                    OPM point of          OPM point of
                                        transmit-end station   receive-end station S810: determine a first signal power from the line side port of the
remote station to the line side port of the transmit-end station
according to the first total channel power and the first noise power S820: determine a second signal power from the line side port of the
remote station to a line side port of the receive-end station according
to the second total channel power and the second noise power S830: determine the OSNR of the channel to be measured according
to the spectral bandwidth of the channel to be measured, the first
signal power, the first noise power, the second signal power, and the
second noise power

FIG. 8

OPTICAL SIGNAL-TO-NOISE RATIO MEASUREMENT METHOD AND APPARATUS, AND COMPUTER STORAGE MEDIUM

CROSS-REFERENCE TO RELATED APPLICATION

This application is a national stage filing under 35 U.S.C. § 371 of international application number PCT/CN2022/098224, filed Jun. 10, 2022, which claims priority to Chinese patent application No. 202110719881.2 filed Jun. 28, 2021. The contents of these applications are incorporated herein by reference in their entirety.

TECHNICAL FIELD

The present disclosure relates to the field of Optical Performance Monitoring (OPM) technologies, and in particular, to an Optical Signal-To-Noise Ratio (OSNR) measurement method and apparatus, and a computer storage medium.

BACKGROUND

Optical Transport Network (OTN) technology is a novel optical transport technology that can implement signal transmission, switching, multiplexing, and other functions based on a variety of granularities. OTNs have important requirements for the survivability of services. There are a large number of idle optical path resources in OTNs to provide restoration path resources for faulty services.

At present, in mainstream optical path performance detection technologies, the performance evaluation of an optical path detected is implemented based on measurement of performance parameters of a service optical signal in the optical path, e.g., an optical power and an OSNR. However, there is no service optical signal in idle channels of OTNs, and devices such as optical switches and Wavelength Selective Switches (WSSs) through which the idle channels pass are also off. In this case, the optical performance of these idle channels is difficult to monitored.

SUMMARY

The following is a summary of the subject matter set forth in this description. This summary is not intended to limit the scope of protection of the claims.

Embodiments of the present disclosure provide an OSNR measurement method and apparatus, and a computer storage medium, to measure an OSNR of an idle channel by adjusting a signal width of a measurement light source.

In accordance with a first aspect of the present disclosure, an embodiment provides an OSNR measurement method, which is applied to an OSNR measurement system including a measurement light source arranged at a transmit-end station, where an output end of the measurement light source is connected to a line side port of the transmit-end station. The OSNR measurement method may include: adjusting the measurement light source to an Amplified Spontaneous Emission (ASE) state; adjusting a signal width of the measurement light source to a first width according to a spectral bandwidth of a channel to be measured, and acquiring a total channel power at an OPM point of a receive-end station, where the channel to be measured is an idle channel from the line side port of the transmit-end station to a line side port of the receive-end station, and the first width is not greater than the spectral bandwidth of the channel to be measured; adjusting the signal width of the measurement light source to a second width, and acquiring a noise power at the OPM point of the receive-end station, where the second width is less than the first width, and a center frequency of a signal corresponding to the second width is staggered apart from a center frequency of a signal corresponding to first second width; and determining an OSNR of the channel to be measured according to the total channel power and the noise power.

In accordance with a second aspect of the present disclosure, an embodiment provides an OSNR measurement method, which is applied to an OSNR measurement system including a measurement light source arranged at a remote station, where an output end of the measurement light source is connected to a line side port of the remote station. The OSNR measurement method may include: adjusting the measurement light source to an ASE state; adjusting a signal width of the measurement light source to a first width according to a spectral bandwidth of a channel to be measured, and acquiring a first total channel power at an OPM point of a transmit-end station and a second total channel power at an OPM point of a receive-end station, where the channel to be measured is an idle channel from a line side port of the transmit-end station to a line side port of the receive-end station, and the first width is not greater than the spectral bandwidth of the channel to be measured; adjusting the signal width of the measurement light source to a second width, and acquiring a first noise power at the OPM point of the transmit-end station and a second noise power at the OPM point of the receive-end station, where the second width is less than the first width, and a center frequency of a signal corresponding to the second width is staggered apart from a center frequency of a signal corresponding to the first width; and determining an OSNR of the channel to be measured according to the first total channel power, the second total channel power, the first noise power, and the second noise power.

In accordance with a third aspect of the present disclosure, an embodiment provides an OSNR measurement system, which may include at least one processor and a memory communicably connected to the at least one processor, where the memory stores an instruction executable by the at least one processor which, when executed by the at least one processor, causes the at least one processor to implement the OSNR measurement method of the first aspect or the OSNR measurement method of the second aspect.

In accordance with a fourth aspect of the present disclosure, an embodiment provides a computer-readable storage medium, storing a computer-executable instruction which, when executed by a computer, causes the computer to implement the OSNR measurement method of the first aspect or the OSNR measurement method of the second aspect.

Additional features and advantages of the present disclosure will be set forth in the description which follows, and in part will be obvious from the description, or may be learned by the practice of the present disclosure. Other advantages of the present disclosure can be realized and obtained by the structures particularly pointed out in the description, claims and drawings.

BRIEF DESCRIPTION OF DRAWINGS

The drawings are provided for understanding of the technical schemes of the present disclosure, and constitute a part of the description. The drawings and the embodiments of the present disclosure are used to illustrate the technical schemes of the present disclosure, and are not intended to constitute a limit to the technical schemes of the present disclosure.

FIG. 8 is a flowchart of calculating an OSNR of a channel to be measured at a remote station according to an embodiment of the present disclosure;

DETAILED DESCRIPTION

Figure 1:
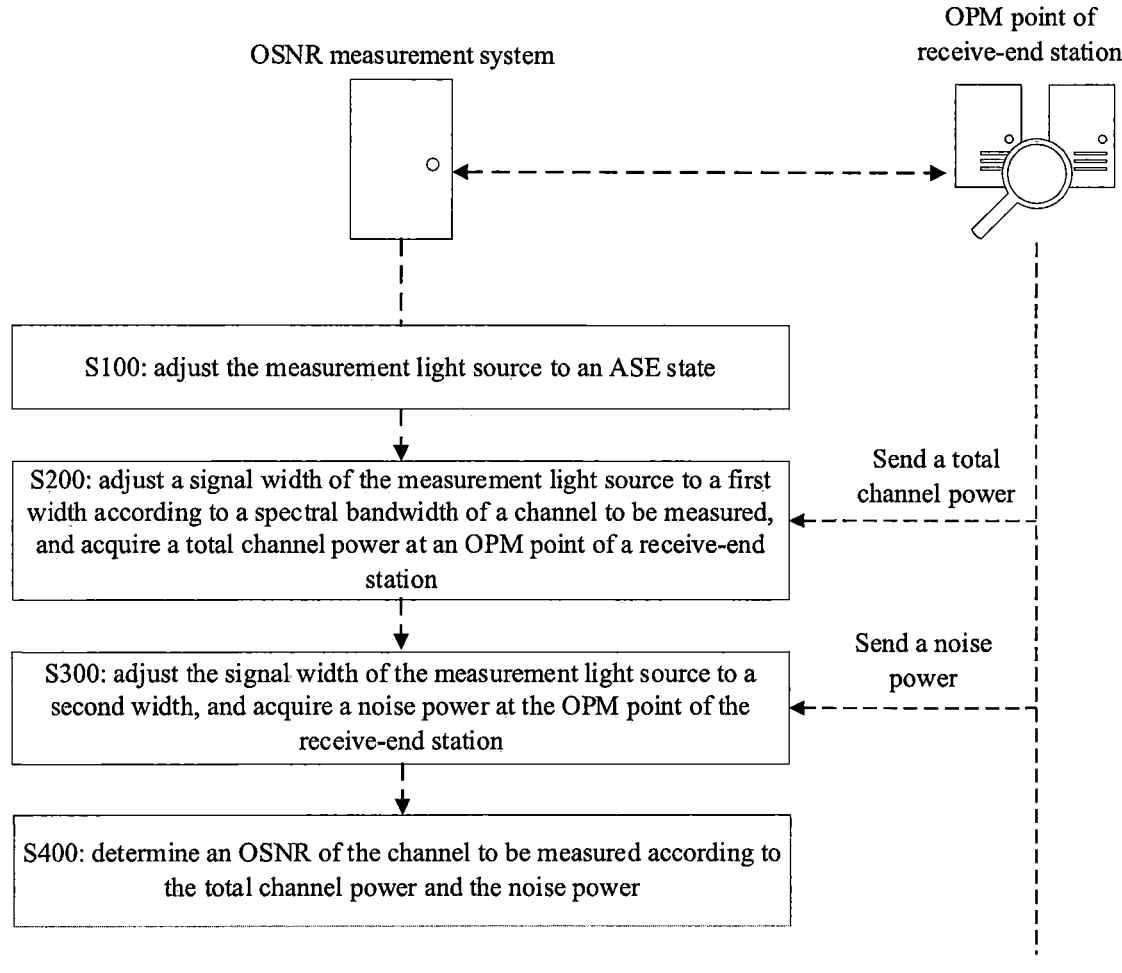
FIG. 1 is an overall flowchart of an OSNR measurement method according to an embodiment of the present disclosure.

To make the technical schemes, and advantages of the present disclosure clear, the present disclosure is described in detail in conjunction with the accompanying drawings and examples. It should be understood that the embodiments described herein are merely used for illustrating the present disclosure, and are not intended to limit the present disclosure.

OTN technology is a novel optical transport system, which inherits the advantages of Synchronous Digital Hierarchy (SDH) networks and Wavelength Division Multiplexing (WDM) networks, and has the advantages of high capacity and satisfactory management and control mechanism. The OTN can realize the functions of transmission, exchange, and multiplexing of signals at various granularities. In addition, the OTN can support a variety of upper-layer services and protocols, and is an important networking technology for optical bearer networks.

The OTN can improve the transmission capacity of a single fiber by combining different wavelengths in a specified fiber and transmitting the wavelengths at the same time. When a combined signal of different wavelengths passes through a station, an optical amplifier device in the station performs power amplification on the combined signal to increase the transmission distance. Because a noise signal is also amplified by the optical amplifier device during the signal amplification process, the noise signal becomes very large after the signal is amplified by a plurality of optical amplifier devices. To monitor and control the signal quality of the station, OPM is introduced to optical communication networks. OSNR is a very important indicator in OPM.

The OSNR is the ratio of optical signal power to noise power in an effective bandwidth of 0.1 nm. By selecting a particular wavelength channel at a station for measurement, an optical signal power and a noise power outputted by the wavelength channel in an optical amplifier device at the station can be obtained, to evaluate the channel quality of the wavelength channel between stations. Therefore, to obtain the optical signal power and the noise power, service optical signals on service paths need to be monitored, and idle channels where no service optical signal exists cannot be monitored. To ensure the survivability of services, a large number of idle optical path resources are reserved in the OTN to provide restoration path resources for faulty services. Because optical performance indicators of idle channels cannot be predicted in advance, when a service becomes faulty and is switched to these idle channels, if the service cannot be successfully restored, the service will be interrupted for a long time, which will seriously affect the service quality of the network.

In view of the above, the embodiments of the present disclosure provide an OSNR measurement method, which provides a means for measuring an OSNR of an idle channel to be measured. In the method, a waveform of a measurement light source is changed, and a signal power and a noise power of a channel to be measured are respectively acquired at a receive-end station using an OPM technology, to calculate an OSNR of the channel to be measured, thereby achieving the OPM of idle channels.

Referring to FIG. 1, an embodiment of the present disclosure provides an OSNR measurement method, applied to an OSNR measurement system including a measurement light source arranged at a transmit-end station. An output end of the measurement light source is connected to a line side port of the transmit-end station. The OSNR measurement method includes, but not limited to, the following steps S100, S200, S300, and S400.

At S100, the measurement light source is adjusted to an ASE state.

To perform OSNR measurement on an idle channel, in the embodiment of the present disclosure, an additional measurement light source is connected to the channel to be measured, to provide an optical signal for measurement. Because the measurement light source does not need to really bear a service, a noise signal generated by the measurement light source in the ASE state is used as an initial optical signal for OSNR measurement.

It can be understood that the idle channel corresponds to an idle port in the current station in terms of hardware. The idle port may be an add port or a loopback port of an optical switch (such as an optical filter), an input port or a loopback port of a coupling device such as a combiner, an add port of an Arrayed Waveguide Grating (AWG) device, and the like. In addition, the idle channel corresponds to a wavelength channel on which no service is born on an optical path, indicating that the wavelength channel does not bear a service only at the time of monitoring, or indicating that the wavelength channel is not scheduled to bear a service and is idle all the time. The idle channel may be determined by inspection personnel according to an actual service provisioning status, or may be automatically determined by detecting whether there is a service packet on the wavelength channel, which is not limited herein.

The measurement light source may be implemented using different hardware. For example, the measurement light source is a tunable laser source for generating a laser beam corresponding to a center wavelength of the channel to be measured. However, the tunable laser light source can generate a laser beam of only one center wavelength at a time, and has limitations. For another example, the measurement light source includes a spontaneous emission source and an optical filter, where an output end of the spontaneous emission source is connected to an input end of the optical filter, and an output end of the optical filter is connected to the idle port. The spontaneous emission source may be an Erbium Doped Fiber Application Amplifier (EDFA). In this case, an input end of the EDFA is not connected to an input source, and the EDFA is set to the ASE state, such that a noise source covering multiple channels can be obtained. The optical filter may be an AWG, a WSS, or other combining/splitting devices with a filtering function, and is configured for selecting a wavelength channel for the EDFA.

At S200, a signal width of the measurement light source is adjusted to a first width according to a spectral bandwidth of a channel to be measured, and a total channel power at an OPM point of a receive-end station is acquired, where the channel to be measured is an idle channel from the line side port of the transmit-end station to a line side port of the receive-end station, and the first width is not greater than the spectral bandwidth of the channel to be measured.

At S300, the signal width of the measurement light source is adjusted to a second width, and a noise power at the OPM point of the receive-end station is acquired, where the second width is less than the first width, and a center frequency of a signal corresponding to the second width is staggered apart from a center frequency of a signal corresponding to the first width.

It is defined in the embodiments of the present disclosure that two ends of the channel to be measured are the line side port of the transmit-end station and the line side port of the receive-end station respectively, and neither include a service add/drop path of a device side of the transmit-end station nor include a service add/drop path of a device side of the receive-end station. Therefore, the OSNR of the channel to be measured in the embodiments of the present disclosure is actually an OSNR between OPM points of the two stations.

Figure 2:
FIG. 2 is a schematic diagram of a channel power of a first width according to an embodiment of the present disclosure.
Figure 3:
FIG. 3 is a schematic diagram of a channel power of a second width according to an embodiment of the present disclosure.

Generally, only power of an optical signal in a current channel can be acquired at the OPM point. To obtain the OSNR of the channel to be measured, in the embodiments of the present disclosure, a method of changing the waveform of the measurement light source is adopted, and the power in the current channel is measured at two sides of the receive-end station, so as to calculate a signal optical power of the channel to be measured. In S200, the signal width of the measurement light source is set to the first width according to the spectrum width of the channel to be measured. This operation is for the purpose of enabling the measurement light source to use the optical signal of the corresponding width to fill the spectrum width corresponding to the channel to be measured, such that a scenario where the total channel power is measured at the OPM point of the receive-end station is similar to a scenario where the channel to be measured actually bears a service, facilitating the subsequent operation of changing the signal width of the measurement light source to obtain the noise power. Then, in S300, the signal width of the measurement light source is changed to the second width. Because the second width is less than the first width, S300 is actually an operation of narrowing the measurement light source, such that there are only optical signals within a particular width in the channel to be measured, and other wavelength channels which are not within this width are blocked by the optical filter. In this way, after the optical signal of the second width reaches the receive-end station through amplifier devices of the channel to be measured, the other wavelength channels exhibit a noise floor, and power of these wavelength channels measured at the OPM point of the receive-end station is noise power. FIG. 2 and FIG. 3 respectively show waveforms of the first width and the second width.

It should be noted that the first width may be set to be equal to the spectrum width of the channel to be measured, such that the measurement light source can fill up the channel to be measured, and a more accurate total channel power can be obtained. Alternatively, the first width may be set to be slightly less than the spectrum width of the channel to be measured. In this case, the first width is determined according to an empirical value, as long as the subsequent OSNR measurement is facilitated. The second width may be set according to a network architecture where the channel to be measured is located. For example, in a 100G optical transport system, two adjacent channels for bearing a service are spaced apart by 100 GHz, and the spectral width of the optical channel is 50 GHz. In this case, the optical filter may set the signal width to 12.5 GHZ, such that there is an idle position of 37.5 GHz in the 50 GHz for measuring the noise floor, and a width of 12.5 GHz may be selected to measure the noise power. It can be understood that to measure the OSNR according to the noise power, the center frequency of the signal corresponding to the second width is offset from the center frequency of the signal corresponding to the first width, such that data monitoring can be performed on the channel corresponding to the center frequency of the signal corresponding to the first width at the OPM point.

It can be understood that the OPM point may be implemented using an OPM module. With the maturity of Reconfigurable Optical Add-Drop Multiplexer (ROADM) technology, OPM is widely used in online monitoring of optical power of channels, facilitating the measurement of optical performance indicators such as the OSNR. OPM may be implemented in various manners. For example, the OPM point is a diffraction-based structure including a volume grating and an array detector, or is an interference-based structure using Tunable Optical Filter (TOF) technology, which is not limited herein.

At S400, an OSNR of the channel to be measured is determined according to the total channel power and the noise power.

After the total channel power and the noise power are obtained in S200 and S300, the noise power is subtracted from the total channel power to obtain the signal optical power, and the OSNR of the channel to be measured can be obtained using a corresponding OSNR calculation formula according to the signal optical power and the noise power.

OSNR=(total channel power−noise power)/noise power corresponding to spectral width of 0.1 nm. $B_{OCh}$ represents the first width, $B_{noise}$ represents the second width, $B_{0.1}$ represents the spectral width of 0.1 nm, $P_{OCh}$ represents the total channel power, and $P_{noise}$ represents the noise power. The OSNR can be calculated according to the following formula:

$$OSNR = \frac{(P_{OCh} - P_{noise}/B_{noise} * B_{OCh})}{P_{noise}/B_{noise} * B_{0.1}}.$$

Through the above steps, the measurement light source is provided for the idle channel to be measured, meanwhile, the signal width of the measurement light source is changed, such that the total channel power and the noise power of the channel to be measured can be obtained at the OPM point of the receive-end station, so as to calculate the OSNR of the channel to be measured. The spectrum width of the channel to be measured may be set to a large value, for example, 50 GHz. In this case, with the technical scheme of the embodiments of the present disclosure, measurement light for filling up the spectrum width can still be provided, to simulate an environment where the channel to be measured bears a service over multiple wavelengths, so the measured OSNR is more in line with the actual service scenario.

It should be noted that the OSNR calculated based on the above formula may not represent an OSNR value of the channel to be measured. As the position at which the measurement light source is connected to the receive-end station varies, the OSNR calculated based on the above formula may include an OSNR between an add port of the device side and the line side port. In this case, the OSNR between the add port of the device side and the line side port needs to be subtracted from the OSNR calculated based on the above formula to obtain the OSNR of the channel to be measured. Because the position of the measurement light source is involved, the OSNR correction will be illustrated in detail depending on different positions of the measurement light source.

Figure 4:
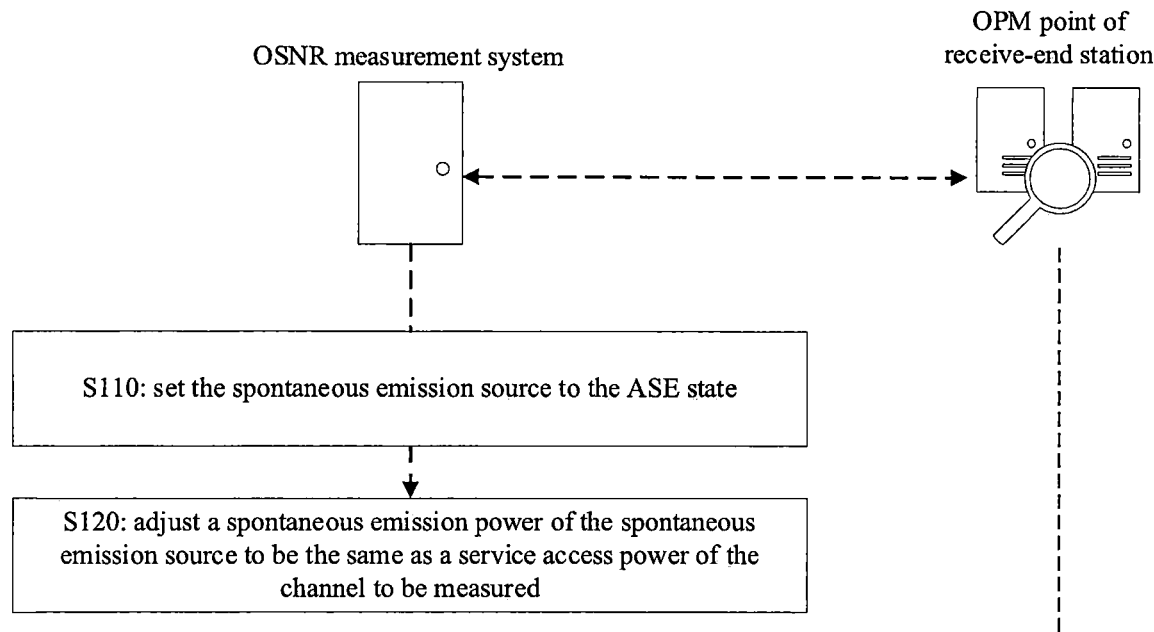
FIG. 4 is a flowchart of adjusting an operational status of a measurement light source according to an embodiment of the present disclosure.

Based on the overall technical scheme described above, to adapt to an actual service scenario of the channel to be measured, the power of the spontaneous emission source may be adjusted, for example, by performing the following steps S110 to S120, as shown in FIG. 4.

At S110, the spontaneous emission source is set to the ASE state.

At S120, a spontaneous emission power of the spontaneous emission source is adjusted to be the same as a service access power of the channel to be measured.

Considering that a set power, i.e., a service access power, is required in a scenario where the channel to be measured bears a service, the power of the spontaneous emission source in the ASE state is adjusted to be the same as the service access power. In this way, based on the power characteristic of the optical signal transmitted in the channel to be measured, a power received by the receive-end station in this case is similar to that received in the scenario where the channel to be measured bears the service. Therefore, the OSNR calculated according to the power received in this case can accurately reflect the actual OSNR in the service bearing scenario.

It can be understood that the measurement light source may be arranged to be directly or indirectly connected to the line side port of the transmit end. The two connection modes will be described in detail below.

(1) In a case where the output end of the measurement light source is directly connected to the line side port of the transmit-end station, the output end of the measurement light source may be connected to the line side port of the transmit-end station in an end-to-end manner through a single fiber, in which case the measurement light source does not pass through the device side port of the transmit-end station.

Figure 5:
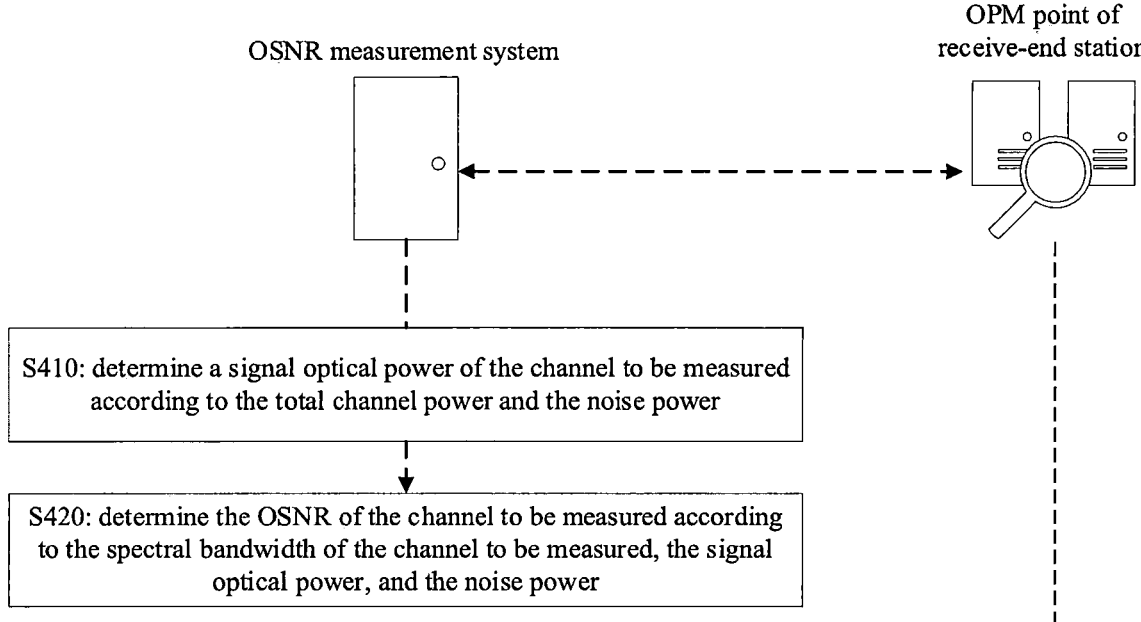
FIG. 5 is a flowchart of calculating an OSNR of a channel to be measured when directly connecting to an idle port according to an embodiment of the present disclosure.

In this case, the calculation of the OSNR in S400 may be implemented by performing the following steps S410 to S420, as shown in FIG. 5.

At S410, a signal optical power of the channel to be measured is determined according to the total channel power and the noise power.

At S420, the OSNR of the channel to be measured is determined according to the spectral bandwidth of the channel to be measured, the signal optical power, and the noise power.

First, the signal optical power of the channel to be measured is determined. Because the total channel power measured at the receive-end station is a sum of the signal optical power and the noise power, the signal optical power can be obtained by subtracting the noise power from the total channel power. Then, the OSNR of the channel to be measured can be obtained using the above OSNR calculation formula.

Because a service in an OTN needs to pass through add-drop ports of a device side, i.e., a transmission path of the service includes a segment from the add port of the device side of the transmit-end station to the line side port of the transmit-end station and a segment from the line side port of the receive-end station to a drop port of the device side of the receive-end station, the OSNR obtained above needs to be corrected to obtain the OSNR value of the service in an actual transmission path:

$$OSNR_{service}^{-1} = OSNR_{to-be-measured}^{-1} + OSNR_{add}^{-1} + OSNR_{drop}^{-1},$$

where $OSNR_{service}$ represents the OSNR of the service in the actual transmission path, $OSNR_{to-be-measured}$ represents the OSNR of the channel to be measured, $OSNR_{add}$ represents the OSNR from the add port of the device side of the transmit-end station to the line side port of the transmit-end station, and $OSNR_{drop}$ represents the OSNR from the line side port of the receive-end station to the drop port of the device side of the receive-end station.

(2) In a case where the output end of the measurement light source is connected to the line side port of the transmit-end station through the add port of the transmit-end station, there is no idle port on the line side, but there is an idle add port on the device side, and the measurement light source may be directly connected to the add port.

Figure 6:
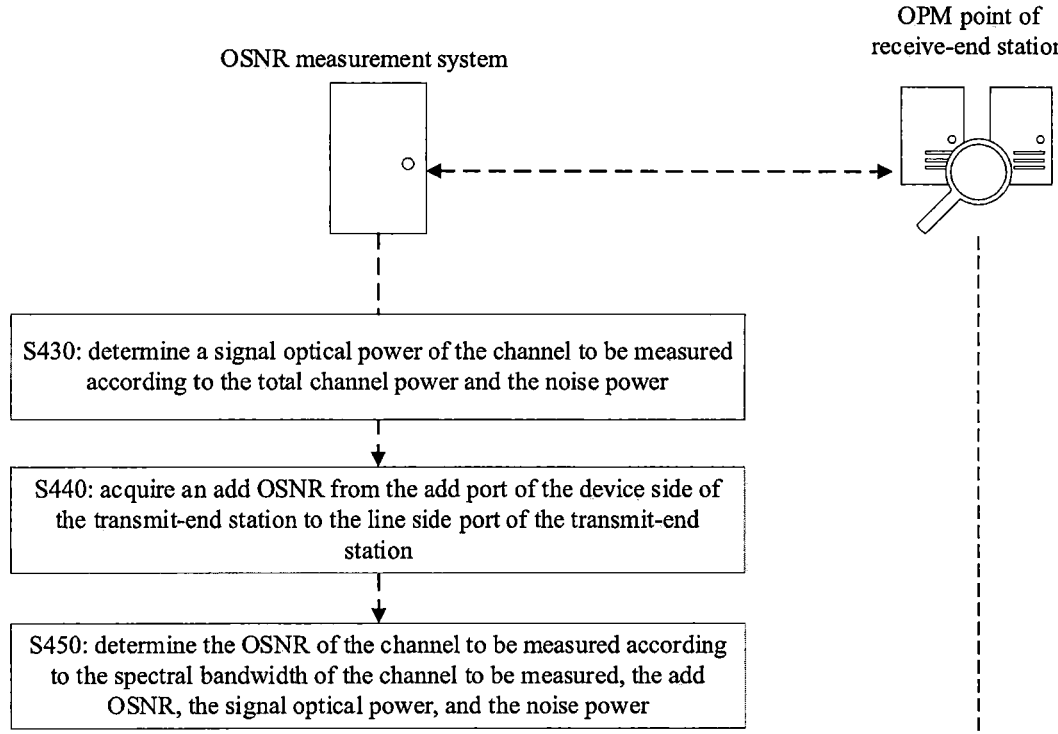
FIG. 6 is a flowchart of calculating an OSNR of a channel to be measured when indirectly connecting to an idle port according to an embodiment of the present disclosure.

In this case, the calculation of the OSNR in S400 may be implemented by performing the following steps S430 to S450, as shown in FIG. 6.

At S430, a signal optical power of the channel to be measured is determined according to the total channel power and the noise power.

At S440, an add OSNR from the add port of the device side of the transmit-end station to the line side port of the transmit-end station is acquired.

At S450, the OSNR of the channel to be measured is determined according to the spectral bandwidth of the channel to be measured, the add OSNR, the signal optical power, and the noise power.

Similarly, first, the signal optical power of the channel to be measured is determined. Because the total channel power measured at the receive-end station is a sum of the signal optical power and the noise power, the signal optical power can be obtained by subtracting the noise power from the total channel power. Then, an OSNR from the add port of the device side of the transmit-end station to the line side port of the receive-end station can be obtained using the above OSNR calculation formula. This OSNR includes the OSNR of the channel to be measured and the OSNR from the add port of the device side of the transmit-end station to the line side port of the transmit-end station. Therefore, the OSNR of the channel to be measured is calculated based on the following formula:

$$OSNR^{-1}_{to-be-measured} = OSNR^{-1}_1 - OSNR^{-1}_{add},$$

where $OSNR_{to-be-measured}$ represents the OSNR of the channel to be measured, $OSNR_1$ represents the OSNR from the add port of the device side of the transmit-end station to the line side port of the receive-end station, and $OSNR_{add}$ represents the OSNR from the add port of the device side of the transmit-end station to the line side port of the transmit-end station.

To obtain the OSNR value of the service in the actual transmission path, the OSNR from the line side port of the receive-end station to the drop port of the device side of the receive-end station may be added to $OSNR_1$, as shown in the following formula:

$$OSNR^{-1}_{service} = OSNR^{-1}_1 + OSNR^{-1}_{drop},$$

where $OSNR_{service}$ represents the OSNR of the service in the actual transmission path, and $OSNR_{drop}$ represents the OSNR from the line side port of the receive-end station to the drop port of the device side of the receive-end station.

It can be understood that $OSNR_{add}$ and $OSNR_{drop}$ may be OSNR values acquired by conventional means at the deployment stage or at the operation and maintenance stage, and will not be described in detail herein.

On the other hand, because a segment from the add port to the line side port may pass through a plurality of components, e.g., a plurality of amplifier devices, a plurality of optical filters, etc., the OSNR from the add port of the device side of the transmit-end station to the line side port of the transmit-end station may include OSNR values of a plurality of segments. Similarly, the OSNR from the line side port of the receive-end station to the drop port of the device side of the receive-end station may also include OSNR values of a plurality of segments. The compositions of the OSNR may be determined by an actual device connection mode of the station.

Figure 7:
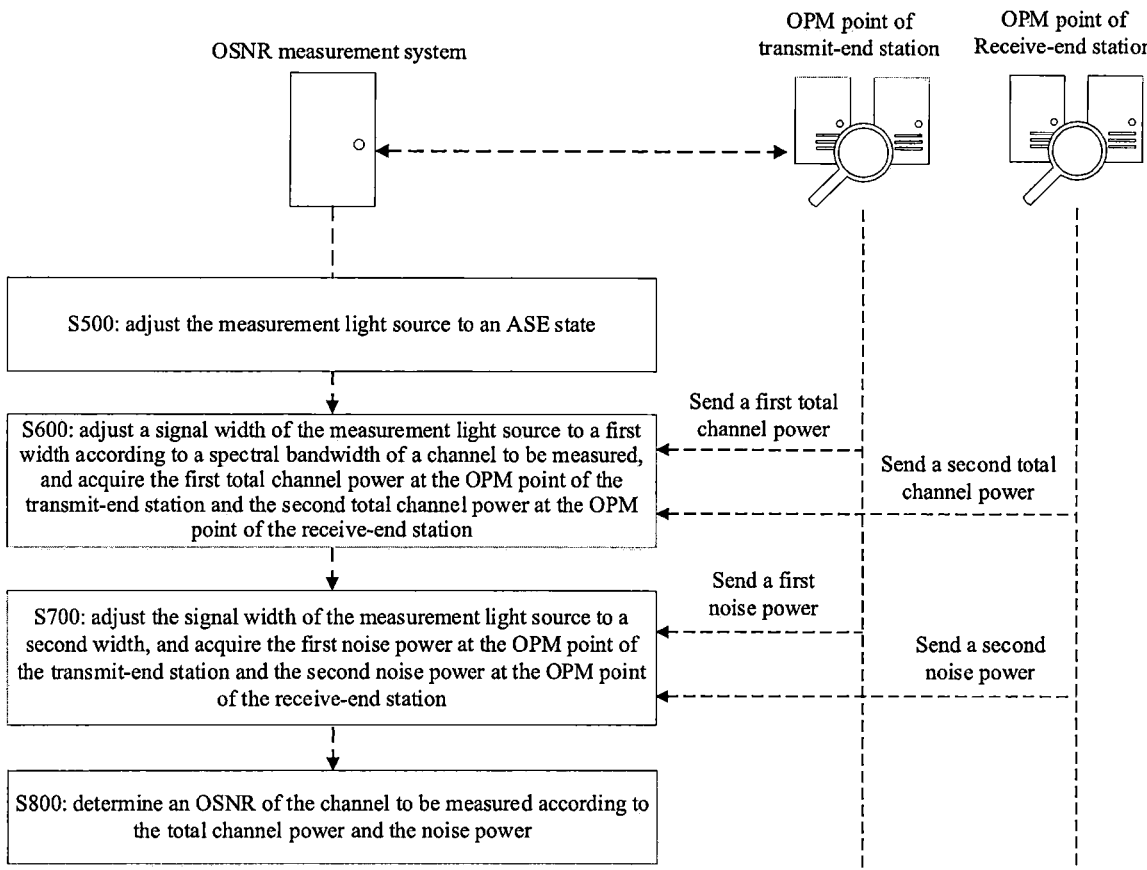
FIG. 7 is an overall flowchart of an OSNR measurement method according to an embodiment of the present disclosure.

As can be seen from the above two OSNR measurement scenarios, the measurement light source is arranged at the transmit-end station, and is locally connected to the line side port of the transmit-end station in a direct or indirect manner. However, in some cases, there is no idle port locally at the transmit-end station, and the measurement of the channel to be measured needs to be performed through an idle port of a remote station. Therefore, an embodiment of the present disclosure provides an OSNR measurement method, applied to an OSNR measurement system including a measurement light source arranged at a remote station. An output end of the measurement light source is connected to a line side port of the remote station. The OSNR measurement method includes, but not limited to, the following steps S500, S600, S700, and S800, as shown in FIG. 7.

At S500, the measurement light source is adjusted to an ASE state.

In the embodiment of the present disclosure, the measurement light source is arranged at the remote station, the remote station has an idle port connected to the measurement light source, and the idle port of the remote station is a line side port and is connected to a line side port of a first station through a fiber cable. Similarly, to obtain an optical signal covering multiple channels, the measurement light source is set to an ASE state.

It can be understood that in the embodiment of the present disclosure, the measurement light source may also include a spontaneous emission source and an optical filter, where an output end of the spontaneous emission source is connected to an input end of the optical filter, and an output end of the optical filter is connected to the idle port. As for hardware devices used to implement the spontaneous emission source and the optical filter, reference may be made to the description of the above step S100, and the details will not be repeated herein.

At S600, a signal width of the measurement light source is adjusted to a first width according to a spectral bandwidth of a channel to be measured, and a first total channel power at an OPM point of a transmit-end station and a second total channel power at an OPM point of a receive-end station are acquired, where the channel to be measured is an idle channel from the line side port of the transmit-end station to a line side port of the receive-end station, and the first width is not greater than the spectral bandwidth of the channel to be measured.

At S700, the signal width of the measurement light source is adjusted to a second width, and a first noise power at the OPM point of the transmit-end station and a second noise power at the OPM point of the receive-end station are acquired, where the second width is less than the first width, and a center frequency of a signal corresponding to the first width is staggered apart from a center frequency of a signal corresponding to the second width.

At S800, an OSNR of the channel to be measured is determined according to the first total channel power, the second total channel power, the first noise power, and the second noise power.

In the embodiment of the present disclosure, because the transmit-end station cannot be directly used as a starting point of measurement, the OSNR of the channel to be measured needs to be calculated according to OSNRs of paths to the two ends. For example, the first station and a second station are each provided with an OPM point. Starting from the remote station, the signal width of the measurement light source is set to the first width, the first total channel power is obtained at the OPM point of the transmit-end station, and the second total channel power is obtained at the OPM point of the receive-end station. Then, the signal width of the measurement light source is adjusted to the second width, the first noise power is obtained at the OPM point of the transmit-end station, and the second noise power is obtained at the OPM point of the receive-end station. As such, two sets of data starting from the remote station are obtained, where a first set of data includes the first total channel power and the first noise power between the remote station and the transmit-end station, and a second set of data includes the second total channel power and the second noise power between the remote station and the receive-end station. The OSNR from the line side port of the remote station to the line side port of the transmit-end station may be obtained by using the OSNR calculation formula according to the first set of data. The OSNR from the line side port of the transmit-end station to the line side port of the receive-end station may be obtained by using the OSNR calculation formula according to the second set of data. The OSNR of the channel to be measured can be determined by performing a subtraction operation on the OSNRs obtained according to the two sets of data, as shown by the following formula:

$$OSNR^{-1}_{to-be-measured} = OSNR^{-1}_3 - OSNR^{-1}_2,$$

where $OSNR_{to-be-measured}$ represents the OSNR of the channel to be measured, $OSNR_2$ represents the OSNR from the line side port of the remote station to the line side port of the transmit-end station, and $OSNR_3$ represents the OSNR from the line side port of the remote station to the line side port of the receive-end station.

Referring to FIG. 8, the above calculation process may be implemented by performing the following steps S810 to S830.

At S810, a first signal power from the line side port of the remote station to the line side port of the transmit-end station is determined according to the first total channel power and the first noise power.

At S820, a second signal power from the line side port of the remote station to the line side port of the receive-end station is determined according to the second total channel power and the second noise power.

At S830, the OSNR of the channel to be measured is determined according to the spectral bandwidth of the channel to be measured, the first signal power, the first noise power, the second signal power, and the second noise power.

For a calculation method used to determine the OSNR from the line side port of the remote station to the line side port of the transmit-end station according to the spectral bandwidth of the channel to be measured, the first signal power, and the first noise power, reference may be made to the above step S400. Similarly, for a calculation method used to determine the OSNR from the line side port of the remote station to the line side port of the receive-end station according to the spectral bandwidth of the channel to be measured, the second signal power, and the second noise power, reference may also be made to S400. Therefore, the calculation processes will not be described in detail herein.

Similarly, to obtain the OSNR of the service in the actual transmission path, an OSNR from an add port of a device side of the transmit-end station to the line side port of the transmit-end station and an OSNR from the line side port of the receive-end station to a drop port of a device side of the receive-end station need to be considered. Therefore, the OSNR is corrected according to the actual transmission path of the service:

$$OSNR_{service}^{-1} = OSNR_{to-be-measured}^{-1} + OSNR_{add}^{-1} + OSNR_{drop}^{-1},$$

where $OSNR_{service}$ represents the OSNR of the service in the actual transmission path, $OSNR_{add}$ represents the OSNR from the add port of the device side of the transmit-end station to the line side port of the transmit-end station, and $OSNR_{drop}$ represents the OSNR from the line side port of the receive-end station to the drop port of the device side of the receive-end station.

It can be understood that because a segment from the add port to the line side port may pass through a plurality of components, e.g., a plurality of amplifier devices, a plurality of optical filters, etc., the OSNR from the add port of the device side of the transmit-end station to the line side port of the transmit-end station may include OSNR values of a plurality of segments. Similarly, the OSNR from the line side port of the receive-end station to the drop port of the device side of the receive-end station may also include OSNR values of a plurality of segments. The compositions of the OSNR may be determined by an actual device connection mode of the station.

Through the method for OSNR measurement at the remote station in the embodiment of the present disclosure, the measurement of the channel to be measured is implemented at the remote station, thereby solving the problem that the OSNR of the channel to be measured cannot be measured due to a lack of an idle port at a local station.

Regardless of whether the OSNR of the channel to be measured is measured at a local station or a remote station, the total channel power and the noise power of the channel to be measured are respectively obtained by adjusting the width of the measurement light source, so that the signal optical power of the channel to be measured can be obtained, and the OSNR of the channel to be measured can be calculated, thereby realizing the OPM of the idle service path and greatly improving the network maintenance and management capabilities.

The OSNR measurement methods in the embodiments of the present disclosure will be described below using three examples.

Example One: OSNR Measurement Through Direct Connection to a Local Port

Figure 9:
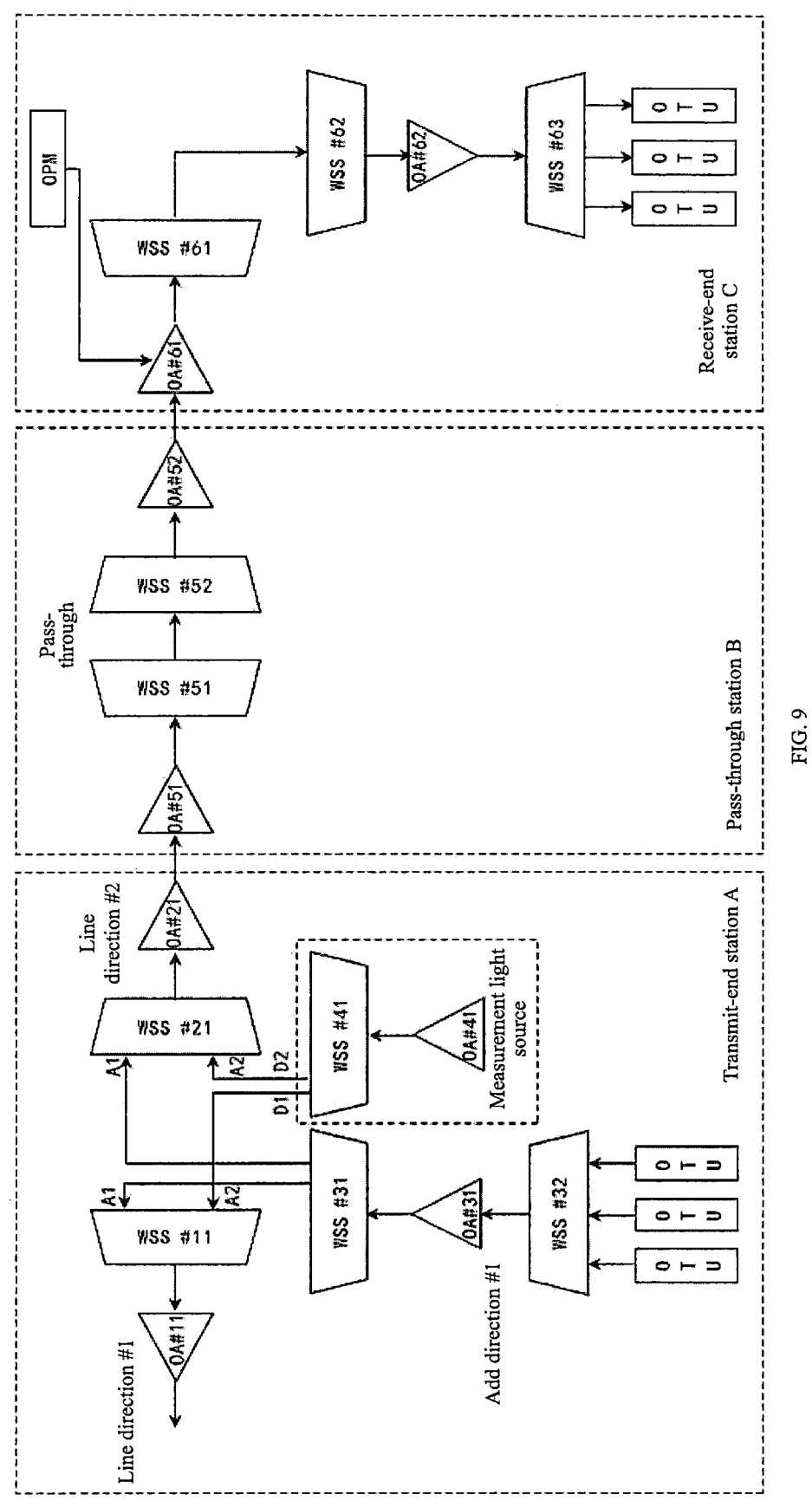
FIG. 9 is a schematic structural diagram of a network according to Example One of the present disclosure.

Referring to a network configuration diagram shown in FIG. 9, in this example, an OSNR from a transmit-end station A to a receive-end station C through a pass-through station B needs to be measured. In terms of hardware, the measurement light source uses an EDFA-type Optical Amplifier (OA) and a WSS, respectively denoted by OA #41 and WSS #41 in FIG. 9, where WSS #41 is directly connected to a line side port of the transmit-end station A.

It is assumed that the idle channel to be measured has a center frequency of 192.1 THz and a width of 50 GHz.

A D2 port of WSS #41 is connected to an A2 port of WSS #21, and the measurement light source is connected from WSS #21 to a line direction #2.

Each optical amplifiers and WSSs on the channel to be measured are turned on. For WSS #51 and WSS #52, light with a center frequency of 192.1 THz and a width of 50 GHz is assigned to the connected ports.

Measurement of total channel power: WSS #41 is operated. The light with the center frequency of 192.1 THz and the width of 50 GHz is assigned to the D2 port of WSS #41. A power spectrum is read from an OPM point at receive-end station B to obtain a channel power with a center frequency of 192.1 THz and a width of 50 GHz, i.e., a total channel power, which is defined as $P_{OCh}$. In this operation, the first width set by WSS #41 is equal to the spectrum width of the channel to be measured, and the OPM point is arranged at an output end of OA #61 of receive-end station B.

Measurement of noise power: WSS #41 is operated. Light with a center frequency of 192.0875 GHz and a width of 12.5 GHz is assigned to the D2 port of WSS #41. A power spectrum is read from the OPM point at receive-end station B to obtain a channel power with a center frequency of 192.1125 GHz and a width of 12.5 GHZ, i.e., a noise power, which is defined as $P_{noise}$. It can be seen that in this operation, the second width set by WSS #41 is 12.5 GHz.

The OSNR of the channel to be measured can be determined using the following formula according to the total channel power and the noise power:

$$OSNR = \frac{(P_{OCh} - P_{noise}/B_{noise} * B_{OCh})}{P_{noise}/B_{noise} * B_{0.1}},$$

where $B_{OCh}$ is 50 GHZ, $B_{noise}$ is 12.5 GHZ, and $B_{0.1}$ is 12.5 GHZ. In this example, the OSNR calculated based on the above formula is $OSNR_{to\text{-}be\text{-}measured}$ from the line side port of the transmit-end station A to a line side port of the receive-end station C.

Correction of the OSNR according to an actual transmission path of the service: Service light to be transmitted from the transmit-end station A to the receive-end station C, further needs to pass through an add part of the transmit-end station A and a drop part of the receive-end station C. At present, a variety of methods have been proposed in the industry to acquire OSNRs of the add and drop parts, and the details will not be described herein. Assuming that the OSNR of the add part of the transmit-end station A is defined as $OSNR_{add}$ and the OSNR of the drop part of the receive-end station C is defined as $OSNR_{drop}$, the corrected $OSNR_{service}$ from the add port (service board port) of the transmit-end station A to the drop port (service board port) of the receive-end station C is as follows:

$$OSNR_{service}^{-1} = OSNR_{to\text{-}be\text{-}measured}^{-1} + OSNR_{add}^{-1} + OSNR_{drop}^{-1}.$$

Example Two: OSNR Measurement Through Indirect Connection to a Local Port

Figure 10:
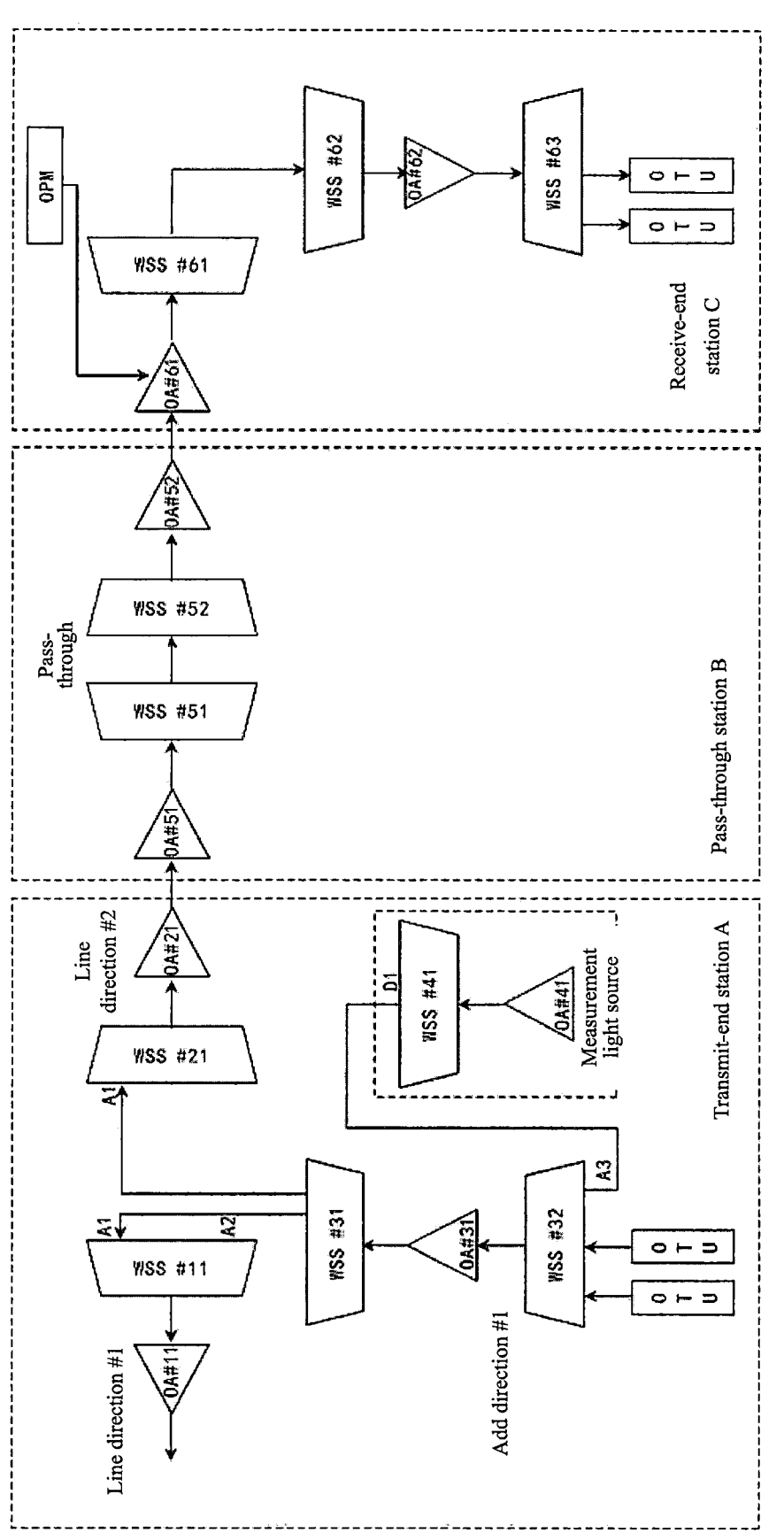
FIG. 10 is a schematic structural diagram of a network according to Example Two of the present disclosure.

Referring R to a network configuration diagram shown in FIG. 10, the difference between Example Two and Example One lies in that there is no idle port on the line side of the transmit-end station A, but there is an idle port among add ports of the device side, and the measurement light source is connected to the idle port among the add ports of the device side of the transmit-end station A. In terms of hardware, the measurement light source also uses an EDFA-type optical amplifier and a WSS, respectively denoted by OA #41 and WSS #41 in FIG. 10, where a D1 port of WSS #41 is connected to an add port of the device side of the transmit-end station A, i.e., an A3 port of WSS #32.

It is assumed that the idle channel to be measured has a center frequency of 192.1 THz and a width of 50 GHz.

Two power values are separately measured based on the method used in Example One. The OSNR from the add port of the device side of the transmit-end station A to the line side port of the receive-end station C may be obtained using the OSNR calculation formula, defined as $OSNR_1$.

Correction of the OSNR according to the actual transmission path of the service: Because $OSNR_1$ already includes the OSNR of the add part of the transmit-end station A, only the OSNR of the drop part of the receive-end station C needs to be further acquired:

$$OSNR_{service}^{-1} = OSNR_1^{-1} + OSNR_{drop}^{-1}.$$

Example Three: OSNR Measurement Through a Non-Local Port

Figure 11:
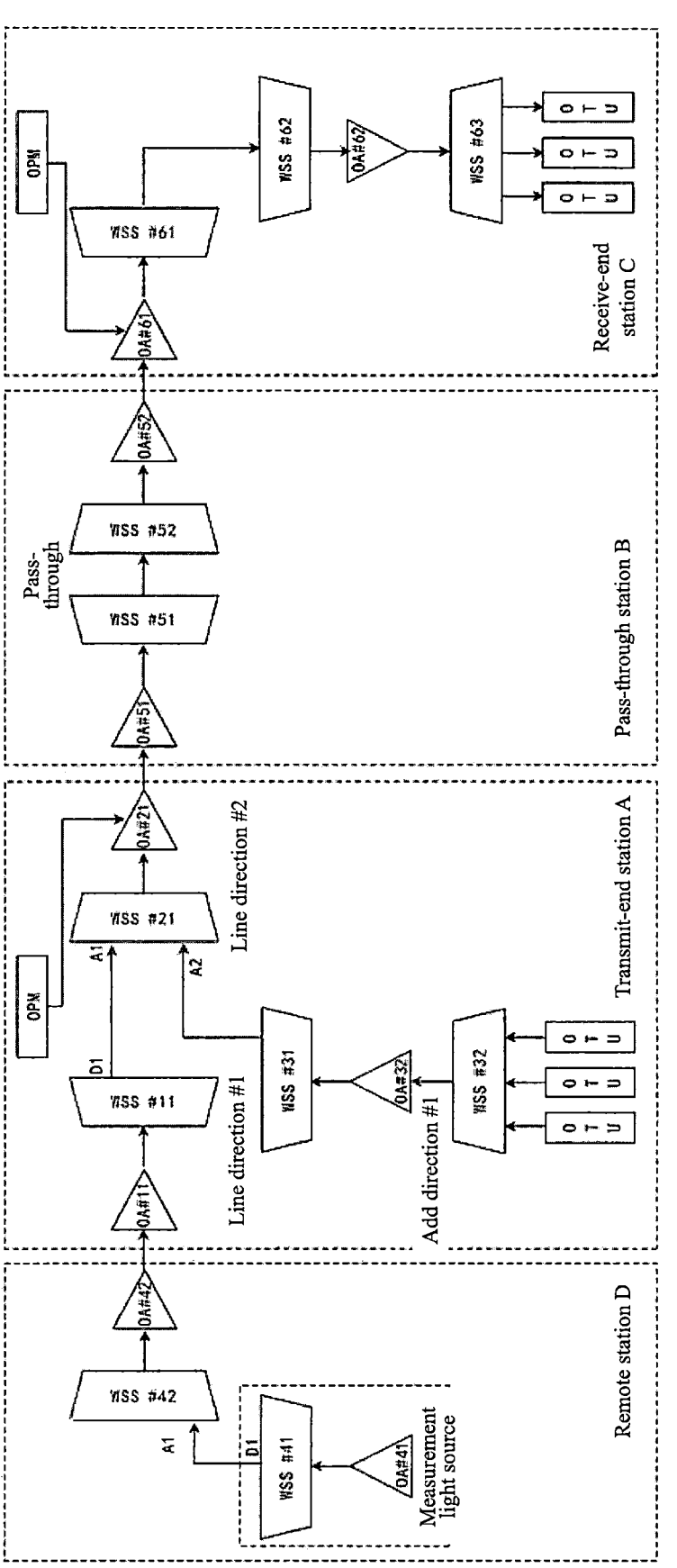
FIG. 11 is a schematic structural diagram of a network according to Example Three of the present disclosure.

Referring to a network configuration diagram shown in FIG. 11, the difference between Example Three and Example One lies in that the measurement light source is arranged at a remote station D and connected to an idle port, which is a line side port of the remote station D. Similarly, an OSNR from a transmit-end station A to a receive-end station C through a pass-through station B needs to be measured. In terms of hardware, the measurement light source is an EDFA-type optical amplifier and a WSS, respectively denoted by OA #41 and WSS #41 in FIG. 11, where WSS #41 is directly connected to a line side port of the remote station D.

It is assumed that the idle channel to be measured has a center frequency of 192.1 THz and a width of 50 GHz.

Based on the method used in Example One and by utilizing the OSNR calculation formula, the OSNR from the line side port of the remote station D to the line side port of the transmit-end station A can be obtained, defined as $OSNR_2$; and the OSNR from the line side port of the remote station D to the line side port of the receive-end station B can be obtained, defined as $OSNR_3$.

The OSNR of the channel to be measured can be determined by performing a subtraction operation on the obtained two OSNRs, as shown by the following formula:

$$OSNR_{to\text{-}be\text{-}measured}^{-1} = OSNR_3^{-1} - OSNR_2^{-1}.$$

Correction of the OSNR according to the actual transmission path of the service: Service light to be transmitted from the transmit-end station A to the receive-end station C, further needs to pass through an add part of the transmit-end station A and a drop part of the receive-end station C. Assuming that the OSNR of the add part of the transmit-end station A is defined as $OSNR_{add}$ and the OSNR of the drop part of the receive-end station C is defined as $OSNR_{drop}$, the corrected $OSNR_{service}$ from the add port (service board port) of the transmit-end station A to the drop port (service board port) of the receive-end station C is as follows:

$$OSNR_{service}^{-1} = OSNR_{to\text{-}be\text{-}measured}^{-1} + OSNR_{add}^{-1} + OSNR_{drop}^{-1}.$$

An embodiment of the present disclosure provides an OSNR measurement system, including at least one processor and a memory communicably connected to the at least one processor, where the memory stores an instruction executable by the at least one processor which, when executed by the at least one processor, causes the at least one processor to implement the OSNR measurement method.

For example, a control processor and a memory in the OSNR measurement system may be connected via a bus. The memory, as a non-transitory computer-readable storage medium, may be configured for storing a non-transitory software program and a non-transitory computer-executable program. In addition, the memory may include a high-speed random access memory, and may also include a non-transitory memory, e.g., at least one magnetic disk storage device, flash memory device, or other non-transitory solid-state storage device. In some implementations, the memory may include memories located remotely from the control processor, and the remote memories may be connected to the OSNR measurement system via a network. Examples of the network include, but are not limited to, the Internet, an intranet, a local area network, a mobile communication network, and combinations thereof.

A person having ordinary skills in the art may understand that the apparatus structure described above does not constitute a limitation to the OSNR measurement system, and the route computation apparatus may include more or fewer components, or some components may be combined, or a different component arrangement may be used.

An embodiment of the present disclosure provides a computer-readable storage medium, storing a computer-executable instruction which, when executed by one or more control processors, for example, by the control processor, may cause the one or more control processors to implement the OSNR measurement method in the above method embodiments, for example, implement the method steps S100 to S400 in FIG. 1, the method steps S110 to S120 in FIG. 4, the method steps S410 to S420 in FIG. 5, the method steps S430 to S450 in FIG. 6, the method steps S500 to S800 in FIG. 7, or the method steps S810 to S830 in FIG. 8.

The apparatus embodiments described above are merely examples. The units described as separate components may or may not be physically separated, i.e., they may be located in one place or may be distributed over a plurality of network units. Some or all of the modules may be selected according to actual needs to achieve the technical scheme of this embodiment.

The OSNR measurement method provided in the embodiments of the present disclosure at least has the following beneficial effects. The OSNR measurement of the embodiments of the present disclosure is applied to an idle service path. A measurement light source provides measurement light for a channel to be measured, a waveform of the measurement light source is changed, and a total power and a noise power of the channel acquired at an OPM point of a receive-end station are used to calculate an OSNR of the channel to be measured. In this way, the OPM of the idle service path is achieved, and the network maintenance and management capabilities are greatly improved. Compared with existing OPM technical schemes, in the embodiments of the present disclosure, the adjustment of the signal width of the measurement light source based on the spectral bandwidth of the channel to be measured can better adapt to an environment of the channel to be measured in a service transmission state, thereby obtaining a more accurate OSNR result.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. An Optical Signal-To-Noise Ratio (OSNR) measurement method, which is applied to an OSNR measurement system comprising a measurement light source arranged at a transmit-end station, wherein an output end of the measurement light source is connected to a line side port of the transmit-end station, the OSNR measurement method comprising:

adjusting the measurement light source to an Amplified Spontaneous Emission (ASE) state;

adjusting a signal width of the measurement light source to a first width according to a spectral bandwidth of a channel to be measured, and acquiring a total channel power at an Optical Performance Monitoring (OPM) point of a receive-end station, wherein the channel to be measured is an idle channel from the line side port of the transmit-end station to a line side port of the receive-end station, and the first width is not greater than the spectral bandwidth of the channel to be measured;

adjusting the signal width of the measurement light source to a second width, and acquiring a noise power at the OPM point of the receive-end station, wherein the second width is less than the first width, and a center frequency of a signal corresponding to the first width is staggered apart from a center frequency of a signal corresponding to the second width; and determining an OSNR of the channel to be measured according to the total channel power and the noise power.

2. The OSNR measurement method of claim 1, wherein the measurement light source comprises a spontaneous emission source and an optical filter, and an output end of the spontaneous emission source is connected to an input end of the optical filter.

3. The OSNR measurement method of claim 2, wherein the spontaneous emission source is an Erbium Doped Fiber Application Amplifier (EDFA), and the optical filter is a Wavelength Selective Switch (WSS).

4. The OSNR measurement method of claim 3, wherein adjusting the measurement light source to an ASE state comprises:

setting the spontaneous emission source to the ASE state; and adjusting a spontaneous emission power of the spontaneous emission source to be the same as a service access power of the channel to be measured.

5. A non-transitory computer-readable storage medium, storing a computer-executable instruction which, when executed by a computer, causes the computer to perform the OSNR measurement method of claim 4.

6. A non-transitory computer-readable storage medium, storing a computer-executable instruction which, when executed by a computer, causes the computer to perform the OSNR measurement method of claim 3.

7. An Optical Signal-To-Noise Ratio (OSNR) measurement system, comprising at least one processor and a memory communicably connected to the at least one processor, wherein the memory stores an instruction executable by the at least one processor which, when executed by the at least one processor, causes the at least one processor to perform the OSNR measurement method of claim 2.

8. A non-transitory computer-readable storage medium, storing a computer-executable instruction which, when executed by a computer, causes the computer to perform the OSNR measurement method of claim 2.

9. The OSNR measurement method of claim 1, wherein an output end of the measurement light source is directly connected to the line side port of the transmit-end station, and determining an OSNR of the channel to be measured according to the total channel power and the noise power comprises:

determining a signal optical power of the channel to be measured according to the total channel power and the noise power; and determining the OSNR of the channel to be measured according to the spectral bandwidth of the channel to be measured, the signal optical power, and the noise power.

10. A non-transitory computer-readable storage medium, storing a computer-executable instruction which, when executed by a computer, causes the computer to perform the OSNR measurement method of claim 9.

11. The OSNR measurement method of claim 1, wherein an output end of the measurement light source is connected to the line side port of the transmit-end station through an add port of a device side of the transmit-end station, and determining an OSNR of the channel to be measured according to the total channel power and the noise power comprises:

determining a signal optical power of the channel to be measured according to the total channel power and the noise power;

acquiring an add OSNR from the add port of the device side of the transmit-end station to the line side port of the transmit-end station; and determining the OSNR of the channel to be measured according to the spectral bandwidth of the channel to be measured, the add OSNR, the signal optical power, and the noise power.

12. A non-transitory computer-readable storage medium, storing a computer-executable instruction which, when executed by a computer, causes the computer to perform the OSNR measurement method of claim 11.

13. An Optical Signal-To-Noise Ratio (OSNR) measurement system, comprising at least one processor and a memory communicably connected to the at least one processor, wherein the memory stores an instruction executable by the at least one processor which, when executed by the at least one processor, causes the at least one processor to perform the OSNR measurement method of claim 1.

14. A non-transitory computer-readable storage medium, storing a computer-executable instruction which, when executed by a computer, causes the computer to perform the OSNR measurement method of claim 1.

15. An Optical Signal-To-Noise Ratio (OSNR) measurement method, which is applied to an OSNR measurement system comprising a measurement light source arranged at a remote station, wherein an output end of the measurement light source is connected to a line side port of the remote station, the OSNR measurement method comprising:

adjusting the measurement light source to an Amplified Spontaneous Emission (ASE) state;

adjusting a signal width of the measurement light source to a first width according to a spectral bandwidth of a channel to be measured, and acquiring a first total channel power at an Optical Performance Monitoring (OPM) point of a transmit-end station and a second total channel power at an OPM point of a receive-end station, wherein the channel to be measured is an idle channel from a line side port of the transmit-end station to a line side port of the receive-end station, and the first width is not greater than the spectral bandwidth of the channel to be measured;

adjusting the signal width of the measurement light source to a second width, and acquiring a first noise power at the OPM point of the transmit-end station and a second noise power at the OPM point of the receive-end station, wherein the second width is less than the first width, and a center frequency of a signal corresponding to the first width is staggered apart from a center frequency of a signal corresponding to the second width; and determining an OSNR of the channel to be measured according to the first total channel power, the second total channel power, the first noise power, and the second noise power.

16. The OSNR measurement method of claim 15, wherein determining an OSNR of the channel to be measured according to the first total channel power, the second total channel power, the first noise power, and the second noise power comprises:

determining a first signal power from the line side port of the remote station to the line side port of the transmit-end station according to the first total channel power and the first noise power;

determining a second signal power from the line side port of the remote station to the line side port of the receive-end station according to the second total channel power and the second noise power; and determining the OSNR of the channel to be measured according to the spectral bandwidth of the channel to be measured, the first signal power, the first noise power, the second signal power, and the second noise power.

17. An Optical Signal-To-Noise Ratio (OSNR) measurement system, comprising at least one processor and a memory communicably connected to the at least one processor, wherein the memory stores an instruction executable by the at least one processor which, when executed by the at least one processor, causes the at least one processor to perform the OSNR measurement method of claim 16.

18. A non-transitory computer-readable storage medium, storing a computer-executable instruction which, when executed by a computer, causes the computer to perform the OSNR measurement method of claim 16.

19. An Optical Signal-To-Noise Ratio (OSNR) measurement system, comprising at least one processor and a memory communicably connected to the at least one processor, wherein the memory stores an instruction executable by the at least one processor which, when executed by the at least one processor, causes the at least one processor to perform the OSNR measurement method of claim 7.

20. A non-transitory computer-readable storage medium, storing a computer-executable instruction which, when executed by a computer, causes the computer to perform the OSNR measurement method of claim 15.

\* \* \* \* \*